US012620615B1

(12) United States Patent
Cui et al.

(10) Patent No.: US 12,620,615 B1
(45) Date of Patent: May 5, 2026

(54) WOUND CELL, BATTERY STRUCTURE, FLEXIBLE DISPLAY DEVICE, AND HOT PRESSING DEVICE

(71) Applicant: BOE Technology Group Co., Ltd., Beijing (CN)

(72) Inventors: Yue Cui, Beijing (CN); Yuehan Wei, Beijing (CN); Sitong Chen, Beijing (CN); Hong Zhu, Beijing (CN); Boyang Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 574 days.

(21) Appl. No.: 18/021,812

(22) PCT Filed: Oct. 21, 2021

(86) PCT No.: PCT/CN2021/125422
§ 371 (c)(1),
(2) Date: Feb. 17, 2023

(87) PCT Pub. No.: WO2022/105530
PCT Pub. Date: May 27, 2022

(30) Foreign Application Priority Data

Nov. 20, 2020　(CN) .......................... 202011311794.5

(51) Int. Cl.
*H01M 10/04* (2006.01)
*H01M 50/533* (2021.01)

(52) U.S. Cl.
CPC ... *H01M 10/0431* (2013.01); *H01M 10/0409* (2013.01); *H01M 50/533* (2021.01); *H01M 2220/30* (2013.01)

(58) Field of Classification Search
CPC ......... H01M 10/0587; H01M 10/0525; H01M 2220/20; H01M 10/0431; H01M 10/286
See application file for complete search history.

(56) References Cited

U.S. PATENT DOCUMENTS

2017/0338518 A1*　11/2017　Zhu ................... H01M 10/0525
2019/0036068 A1*　1/2019　Kim ...................... H05K 1/147
(Continued)

FOREIGN PATENT DOCUMENTS

CN　　201450073 U　　5/2010
CN　　104377382 A　　2/2015
(Continued)

OTHER PUBLICATIONS

International Search Report and Written Opinion issued Jan. 19, 2022, in corresponding International Application No. PCT/CN2021/125422, 8pp.
(Continued)

*Primary Examiner* — Tiffany Legette
*Assistant Examiner* — Monique M Wills
(74) *Attorney, Agent, or Firm* — XSENSUS LLP

(57) ABSTRACT

The present disclosure relates to the technical field of batteries, and in particular to a wound cell, a battery structure, a flexible display device and a hot pressing device. The wound cell has a first end face and a second end face which are opposite to each other in a winding axis direction, and an outer surface located between the first end face and the second end face. The outer surface comprises four side planes which are sequentially connected end to end, and the joints of at least two adjacent side planes are chamfered. A tab protrudes from at least one of the first end surface and the second end surface, and is capable of being bent to the side planes.

10 Claims, 6 Drawing Sheets

10

(56)     References Cited

U.S. PATENT DOCUMENTS

| | | | | |
|---|---|---|---|---|
| 2019/0341585 A1* | 11/2019 | Shi | ........................ | H01M 50/24 |
| 2020/0212408 A1* | 7/2020 | Zhang | .................... | H01M 50/46 |

FOREIGN PATENT DOCUMENTS

| | | |
|---|---|---|
| CN | 105762405 A | 7/2016 |
| CN | 108054433 A | 5/2018 |
| CN | 208127332 U | 11/2018 |
| CN | 109830739 A | 5/2019 |
| CN | 111554962 A | 8/2020 |
| CN | 112436176 A | 3/2021 |
| JP | 2000-90961 A | 3/2000 |
| WO | 2013/047515 A1 | 4/2013 |
| WO | 2018/036489 A1 | 3/2018 |

OTHER PUBLICATIONS

Chinese Office Action issued Aug. 4, 2021, in corresponding Chinese Patent Application No. 202011311794.5, 23pp.
Chinese Office Action issued Apr. 11, 2022, in corresponding Chinese Patent Application No. 202011311794.5, 17pp.
Chinese Notice to Grant issued Aug. 9, 2022, in corresponding Chinese Patent Application No. 202011311794.5, 7pp.

* cited by examiner

WOUND CELL, BATTERY STRUCTURE, FLEXIBLE DISPLAY DEVICE, AND HOT PRESSING DEVICE

CROSS REFERENCE

The present disclosure is a National Stage of International Application No. PCT/CN2021/125422, filed on Oct. 21, 2021, which claims the benefit of priority to Chinese Patent Application No. 202011311794.5, filed on Nov. 20, 2020, both of which are incorporated by reference herein in their entireties for all purposes.

TECHNICAL FIELD

The present disclosure relates to the field of display technology, specifically, to a wound cell, a battery structure, a flexible display device and a hot pressing device.

BACKGROUND

With continuous development of flexible cell phones and other electronic products, users have also put forward high requirements for the battery structure in flexible electronic products. For example, the battery structure is required to have certain bending performance and good ionic conductivity. However, the ionic conductivity and bending performance of the current battery structures are difficult to meet the requirements, which affects the product quality.

It should be noted that the information disclosed in the background technology section above is only for the purpose of enhancing the understanding of the background of the present disclosure, and thus may include information that does not constitute prior art known to those of ordinary skill in the art.

SUMMARY

The first aspect of the present disclosure provides a wound cell, wherein the wound cell has a first end surface and a second end surface opposite to each other in a winding axis direction and an outer peripheral surface disposed between the first end surface and the second end surface, the outer peripheral surface includes four side planes sequentially connected end to end, and a joint of at least two adjacent side planes is provided at a chamfer, and a tab protrudes from at least one of the first end surface and the second end surface, and the tab is capable of being bent to the side planes.

In an exemplary embodiment of the present disclosure, the four side planes include a first side plane and a third side plane parallel to a first reference plane, and a second side plane and a fourth side plane parallel to a second reference plane, wherein the first side plane, the second side plane, the third side plane and the fourth side plane are sequentially connected end to end, the first reference plane and the second reference plane are perpendicular to each other and both the first reference plane and the second reference plane are parallel to the winding axis direction.

In an exemplary embodiment of the present disclosure, the chamfer is an arc chamfer or a planar chamfer.

In an exemplary embodiment of the present disclosure, the arc chamfer is a circular arc chamfer.

In an exemplary embodiment of the present disclosure, the circular arc chamfer has a radius of 0.4 mm to 5 mm.

In an exemplary embodiment of the present disclosure, the chamfer is the planar chamfer, a width of an orthographic projection of the planar chamfer on the first reference plane is a first width, a width of a orthographic projection of the planar chamfer on the second reference parallel is a second width, and the first width is equal to the second width.

In an exemplary embodiment of the present disclosure, the first width and the second width are from 0.4 mm to 5 mm.

In an exemplary embodiment of the present disclosure, the tab is provided with at least two, the at least two tabs include a positive tab and a negative tab, the positive tab protrudes from the first end surface and the negative tab protrudes from the second end surface;

the positive tab and the negative tab are capable of being bent to an identical side plane or being bent to different side planes respectively;

wherein the side plane opposite to the bent positive tab and negative tab is a target side plane, joints of the target side plane and two adjacent side planes are provided at chamfers.

In an exemplary embodiment of the present disclosure, the positive tab and the negative tab are capable of being bent to the first side plane, and a joint of the first side plane and the second side plane and a joint of the first side plane and the fourth side plane are provided at chamfers.

In an exemplary embodiment of the present disclosure, a joint of the third side plane and the second side plane and a joint of the third side plane and the fourth side plane are provided at chamfers.

The second aspect of the present disclosure provides a battery structure, applied to a flexible display device and including:

at least two wound cells spaced in a horizontal direction, wherein the wound cell is any of the wound cells described above, and the positive tabs and the negative tabs of the wound cells are bent to the target side plane, the horizontal direction is perpendicular to the winding axis direction;

at least one first flexible conductive sheet, wherein two ends of the first flexible conductive sheet are connected to the positive tabs of two adjacent wound cells respectively, and a middle portion of the first flexible conductive sheet is capable of being bent;

at least one second flexible conductive sheet, wherein two ends of the second flexible conductive sheet are connected to the negative tabs of two adjacent wound cells respectively, and a middle portion of the second flexible conductive sheet is capable of being bent.

In an exemplary embodiment of the present disclosure, the positive tabs and the negative tabs are bent to the first side plane, the first side plane of each of the wound cells is located in an identical plane.

The third aspect of the present disclosure provides a flexible display device, including the battery structure described above.

The fourth aspect of the present disclosure provides a hot pressing device for wound cells, including a first die and a second die, wherein the first die and the second die are capable of moving relative to each other to enclose a hot pressing cavity for hot pressing wound cells, an inner peripheral surface of the hot pressing cavity matches with the outer peripheral surface of any of the wound cells described above.

It should be noted that the above general description and the following detailed description are merely exemplary and explanatory and should not be construed as limiting of the present disclosure.

BRIEF DESCRIPTION OF THE DRAWINGS

The accompanying drawings, which are incorporated in this specification and constitute a part of this specification, illustrate embodiments consistent with the disclosure and serve to explain the principles of the disclosure together with the description. The drawings in the following description are only some embodiments of the present disclosure, and for those of ordinary skill in the art, other drawings can also be obtained from these drawings without creative effort.

Figure 1:
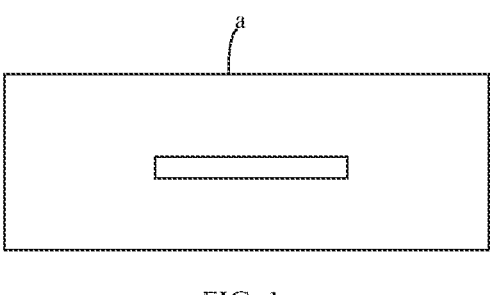
FIG. 1 illustrates a schematic plan view of a square cell in the related art.

THE REFERENCE NUMERALS a, square cell;
10, wound cell; 101, first end surface; 102, second end surface; 103, first side plane; 104, second side plane; 105, third side plane; 106, fourth side plane; 107, chamfer; 108, positive tab; 109, negative tab; 11, first flexible conductive sheet; 12, second flexible conductive sheet; 13, first die; 130, accommodating slot; 130a, bottom surface of the slot; 130b, side surface of the slot; 130c, chamfer; 14, second die; 140, stamping head; 140a, bottom surface; 141, sliding mounting part; 15, guide bar.

DETAILED DESCRIPTION

The technical solutions of the present disclosure are further specified below by means of embodiments and in conjunction with the accompanying drawings. In the specification, the same or similar reference numerals indicate the same or similar components. The following description of embodiments of the present disclosure with reference to the accompanying drawings is intended to explain the general inventive concept of the present disclosure and should not be construed as a limitation of the present disclosure.

Further, in the detailed description below, many specific details are set forth to provide a comprehensive understanding of the embodiments of the present disclosure for ease of interpretation. However, one or more embodiments may also be implemented without these specific details.

Unless otherwise defined, technical terms or scientific terms used in this disclosure shall have the ordinary meaning as understood by persons having ordinary skill in the art to which this disclosure belongs. The terms "first," "second," and the like as used in this disclosure do not indicate any order, number, or importance, but are used only to distinguish the different components.

The words "including" or "having" and the like as used in this disclosure are intended to mean that the component or object appearing before the word covers the listed component or object appearing after the word and its equivalent, and does not exclude other components or objects. As used in the present disclosure, the words "connected" or "connecting" and the like are not limited to physical or mechanical connections, but may also include electrical connections. The words "connected" or "connecting" and the like as used in this disclosure may be a direct connection or an indirect connection.

In the related technology, in order to make the battery structure match more application scenarios, such as folding, curling and other flexible scenarios, a plurality of square cells a as shown in FIG. 1 can be arranged at intervals, and a flexible conductive sheet is used to connect the plurality of square cells a in series or in parallel to form the battery structure. The part of the flexible conductive sheet that is overhanging relative to the square cell a can be bent, to achieve bending of the entire battery structure.

For example, this square cell a may be a wound cell. Specifically, the process of making this square cell a may be as follows. The positive and negative electrode sheets and the separator are wound to form an energy storage unit. Since the energy storage unit made by the winding process is often fluffy inside, it is necessary to introduce a hot pressing process afterwards, to shape the energy storage unit wound in a certain number of turns, to form the square cell a. In the hot pressing process, the combined effect of heat and pressure can make the adhesive-coated separator bond with the positive and negative electrode sheets, to form good interfacial contact, but the square cell a after hot pressing and shaping is prone to generating a hot pressing dead zone, which reduces the ionic conductivity and affects the capacity utilization.

In addition, after this square cell a is connected with the flexible conductive sheet to form the battery structure, during the bending process, the problem of stress concentration easily occurs at the corner position of the square cell a, which greatly affects the bending reliability and flatness.

Figure 2:
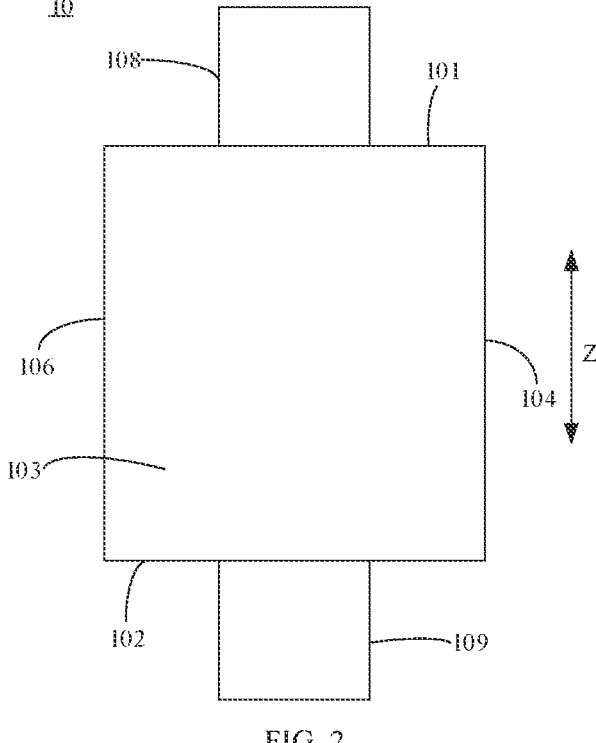
FIG. 2 illustrates a schematic plan view of a wound cell in a first view as described in an embodiment of the present disclosure.

Based on the aforementioned problems, this embodiment of the present disclosure provides a wound cell 10, which includes a positive electrode sheet, a negative electrode sheet and a separator that are laminated and wound together. This separator is located between the positive electrode sheet and the negative electrode sheet, to achieve insulation between the positive electrode sheet and the negative electrode sheet. The separator is coated with an adhesive layer, for bonding with the positive electrode sheet and the negative electrode sheet. As shown in FIG. 2, the wound cell 10 may also include at least two tabs. The at least two tabs may include a positive tab 108 and a negative tab 109. The positive tab 108 may be connected to the positive electrode sheet by fixed modes such as welding or riveting, but not limited to this, the positive tab 108 and the positive electrode sheet may also be cut in one piece. The negative tab 109 may be connected to the negative electrode sheet by fixed modes such as welding or riveting, but not limited to this, the negative tab 109 and the negative electrode sheet may also be cut in one piece.

It should be noted that the wound cell 10 of the present disclosure is formed by winding the stacked positive electrode sheet, negative electrode sheet and separator together in many turns. Therefore, the wound cell 10 of the embodiments of the present disclosure is rigid as a whole. That is, the wound cell is not easily bent and deformed as a whole.

Figure 3:
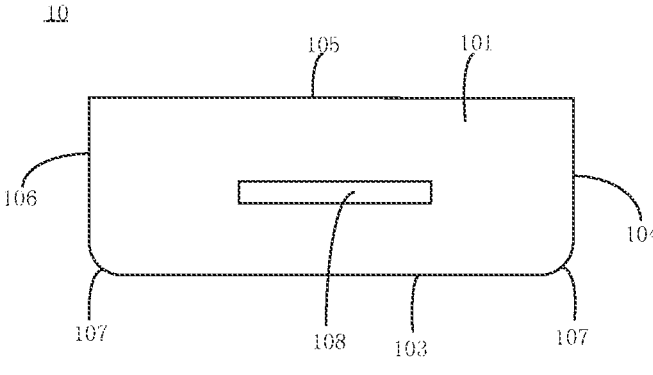
FIG. 3 illustrates a schematic plan view of a wound cell in a second view as described in an embodiment of the present disclosure.

The wound cell 10 of the present disclosure is shaped after winding, to form good interface contact between the separator and the electrode sheets. Specifically, combined with FIGS. 2 and 3, the shaped wound cell 10 may have a first end surface 101 and a second end surface 102 opposite to each other in a winding axis direction Z and an outer peripheral surface disposed between the first end surface 101 and the second end surface 102. The outer peripheral surface may include four side planes sequentially connected end to end, as shown in FIG. 3, and the joint of at least two adjacent side planes is provided at a chamfer 107. By setting the chamfer 107 at the joint of at least two adjacent side planes, the interface contact between the separator and the electrode sheets can be improved, to reduce the internal resistance of the battery, improve the ionic conductivity, and thus improve the capacity utilization.

In addition, as shown in conjunction with FIGS. 2 and 3, a tab protrudes from at least one of the first end surface 101 and the second end surface 102 in the embodiment of the present disclosure, and the tab is capable of being bent to the side planes to connect with the flexible conductive sheet. The flexible conductive sheet is used to connect tabs of the plurality of wound cells 10 arranged at intervals to form a battery structure. A joint of at least two adjacent side planes is provided at a chamfer 107 in the embodiments of the present disclosure, it can also solve the problem of stress concentration at corners of the wound cell 10 and the flexible conductive sheet during the bending process of the battery structure, thus improving the bending reliability and flatness of the product.

In an embodiment, in combination with FIG. 2 and FIG. 3, the four side planes in the outer peripheral surface of the wound cell 10 may include a first side plane 103 and a third side plane 105 parallel to a first reference plane, and a second side plane 104 and a fourth side plane 106 parallel to a second reference plane. The first side plane 103, the second side plane 104, the third side plane 105 and the fourth side plane 106 are sequentially connected end to end. That is, at least adjacent two of the first side plane 103, the second side plane 104, the third side plane 105 and the fourth side plane 106 are set at a chamfer 107.

It should be noted that the first reference plane and the second reference plane in the embodiment of the disclosure are perpendicular to each other and both the first reference plane and the second reference plane are parallel to the winding axis direction Z.

In one embodiment, as shown in FIG. 2, the positive tab 108 of the wound cell 10 may protrude from the first end surface 101, and the negative tab 109 may protrude from the second end surface 102. For example, this positive tab 108 and negative tab 109 may be directly opposite to each other in the winding axis Z, but not limited to this, and the positive tab 108 and negative tab 109 may also be staggered, which depends on specific situations.

It should be noted that, one positive tab 108 may protrude from the first end surface 101, but not limited to it, two or more positive tabs 108 may protrude from the first end surface 101, which depends on specific situations. Similarly, one negative tab 109 may protrude from the second end surface 102, but not limited to it, two or more negative tabs 109 may protrude from the second end surface 102, which depends on specific situations.

In the embodiment, the positive tab 108 and the negative tab 109 can be bent to the same side plane, for example, both can be bent to the first side plane 103, but not limited to this. The positive tab 108 and the negative tab 109 can also be bent to different side planes. For example, the positive tab 108 can be bent to the first side plane 103, and the negative tab 109 can be bent to the fourth side plane 106; or the positive tab 108 can be bent to the second side plane 104, the negative tab 109 can be bent to the third side plane 105, etc.

In the embodiment of the present disclosure, the side plane opposite to the bent positive tab 108 and negative tab 109 can be defined as the target side plane, and the joints of this target side plane and two adjacent side planes are provided at chamfers 107, which can further improve the interface contact between the electrode sheets and the separator, improve the shape of the wound cell 10, thereby reducing the internal resistance of the battery and improving the ionic conductivity, thereby improving the capacity utilization. In addition, the joints of this target side plane and two adjacent side planes are at chamfers 107, it can also reduce the difficulty of arranging a plurality of wound cells 10, so that they can be connected to form a battery structure. In addition, it can also solve the problem of stress concentration at corners of the wound cell 10 and the flexible conductive sheet during the bending process of the battery structure, thus improving the bending reliability and flatness of the product.

For example, when both the positive tab 108 and the negative tab 109 can be bent to the first side plane 103, as shown in FIG. 3, the joints between the first side plane 103 and the second side plane 104, the fourth side plane 106 can be set at chamfers 107. In addition, as shown in FIG. 4, the joints between the third side plane 105 and the second side plane 104, the fourth side plane 106 may also be set at chamfers 107, to improve the overall shaping accuracy and cell capacity of the wound cell 10.

The aforementioned chamfer 107 may be an arc chamfer or a planar chamfer, which are described in detail below.

Figure 4:
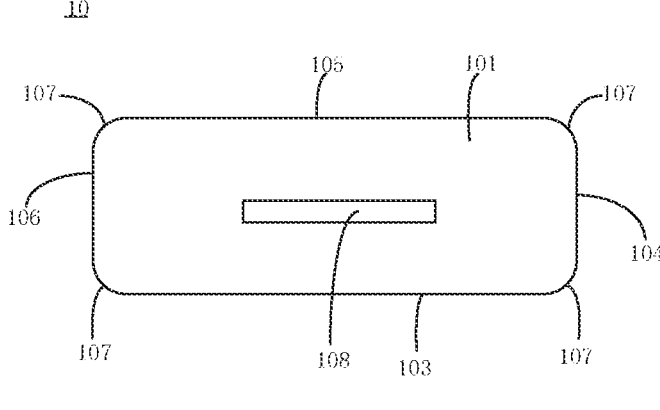
FIG. 4 illustrates a schematic plan view of a wound cell in a second view as described in another embodiment of the present disclosure.

In an embodiment of the present disclosure, as shown in FIGS. 3 and 4, the arc chamfer may be a circular arc chamfer. This design improves the overall shape accuracy and cell capacity of the cell, while also solving the problem of stress concentration at corners of the wound cell 10 and the flexible conductive sheet during the bending process of the battery structure, thus improving the bending reliability and flatness of the product.

In an embodiment, as shown in FIGS. 3 and 4, the radius of this circular arc chamfer may be 0.4 mm to 5 mm. Further, the radius of the circular arc chamfer may be 0.5 mm to 2 mm, for example 0.5 mm, 1 mm, 1.5 mm, 2 mm, etc. By experiments, during bending, the maximum stress at the corner of the square cell a of the related technology in FIG. 1 and the flexible conductive sheet may be 3.172e-1 Mpa. The maximum stress at the circular arc chamfer with a radius of 0.5 mm in the wound cell 10 of this disclosed embodiment and the flexible conductive sheet can be 3.05e-1 Mpa. The maximum stress at the circular arc chamfer with a radius of 2 mm in the wound cell 10 of this disclosed embodiment and the flexible conductive sheet can be 2.91e-1 Mpa. It can be seen that in the embodiment of the present disclosure, by setting the circular arc chamfer at the joint of at least two adjacent side planes of the wound cell 10, it can reduce the concentration stress generated during the bending process compared with the square cell a in the related technology in FIG. 1, thus improving the bending reliability and flatness of the product.

In this embodiment, by designing the radius of the circular arc chamfer to be not less than 0.5 mm, it can avoid that the problem of stress concentration cannot be solved due to too small circular arc chamfer, so as to improve the bending reliability and flatness of the product. By designing the radius of the circular arc chamfer to be not more than 2 mm, it can avoid the situation that the short circuit easily occurs inside the wound cell 10 due to the too large circular arc chamfer, so as to improve the quality of the product.

Figure 5:
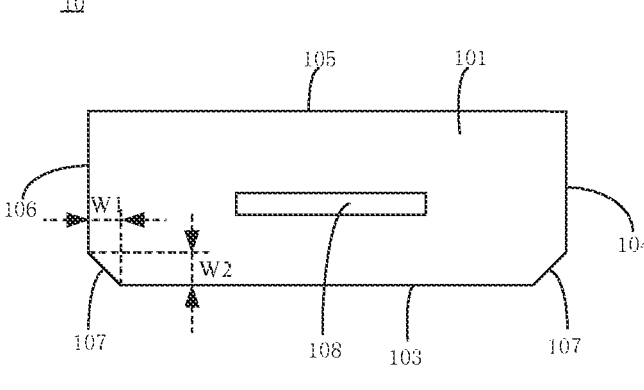
FIG. 5 illustrates a schematic plan view of a wound cell in a second view as described in yet another embodiment of the present disclosure.

In another embodiment of the present disclosure, as shown in FIG. 5, the chamfer 107 may be a planar chamfer. The width of the orthographic projection of this planar chamfer on the first reference plane may be the first width W1, and the width of the orthographic projection of the planar chamfer on the second reference parallel may be the second width W2. This first width W1 and the second width W2 may be equal, such design can improve the shape of the wound cell 10, thus reducing the internal resistance of the battery, improving the ionic conductivity, and then enhancing the capacity utilization.

In an embodiment, the first width W1 and the second width W2 can be 0.4 mm to 5 mm. Further, the first width W1 and the second width W2 can be 0.5 mm to 2 mm, for example, 0.5 mm, 1 mm, 1.5 mm, 2 mm, etc. This design can avoid the situation that the battery internal resistance cannot be lowered due to the too small planar chamfer, on the other hand, it can avoid the situation that the short circuit easily occurs inside the wound cell 10 due to the too large planar chamfer, so as to improve the quality of the product.

Figure 6:
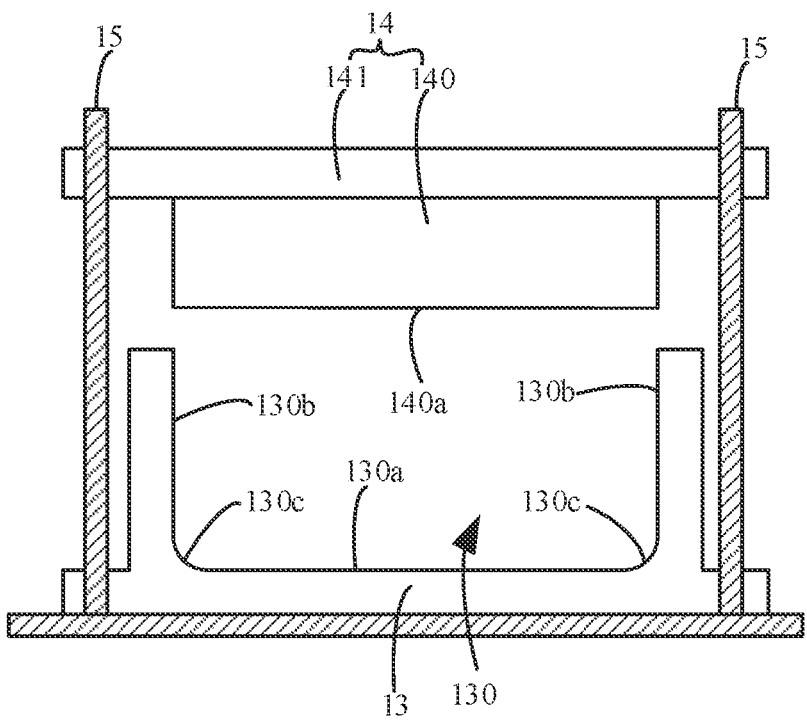
FIG. 6 illustrates a schematic diagram of the structure of the hot pressing device described in an embodiment of the present disclosure.

In order to manufacture the wound cell 10 with a joint of at least two adjacent side planes provided at a chamfer 107, the present embodiment also provides a hot pressing device matching the wound cell 10, as shown in FIG. 6. The hot pressing device may include a first die 13 and a second die 14. The first die 13 and the second die 14 can move relative to each other to enclose a hot pressing cavity for hot pressing the wound cell 10. The inner peripheral surface of this hot pressing cavity matches the outer peripheral surface of the wound cell 10 of any of the above embodiments of the present disclosure.

For example, as shown in FIG. 6, the top of this first die 13 may be provided with an accommodating slot 130 for accommodating the winding cell 10. This accommodating slot 130 has a slot bottom surface 130*a* and slot side surfaces 130*b* located at opposite sides of the slot bottom surface 130*a*. The joints of this slot bottom surface 130*a* and the opposite two side surfaces 130*b* are provided at chamfers 130*c*. The second die 14 may include a stamping head 140. When the second die 14 moves in the direction close to the first die 13, the stamping head 140 may extend into this accommodating slot 130 and the bottom surface 140*a* of the stamping head 140 and the slot bottom surface 130*a*, the two slot side surfaces 130*b* may enclose the aforementioned hot pressing cavity.

It should be noted that this slot bottom surface 130*a*, slot side surfaces 130*b* and the bottom surface 140*a* of the stamping head 140 may match with the four side planes of the above wound cell 10, i.e., in a flat design. The chamfer 130*c* at the joint of the slot bottom surface 130*a* and the slot side surfaces 130*b* may match with the above chamfer 107 of the wound cell 10. That is, when the chamfer 107 of the wound cell 10 needs to be a circular arc chamfer, the chamfer 130*c* at the joint of the slot bottom surface 130*a* and the slot side surfaces 130*b* may also be a circular arc chamfer. When the chamfer 107 of the wound cell 10 needs to be a planar chamfer, the chamfer 130*c* at the joint of the slot bottom surface 130*a* and the slot side surfaces 130*b* may also be a planar chamfer.

In an embodiment of the present disclosure, the side plane opposite to the slot bottom surface 130*a* in the wound cell 10 may be the first side plane 103 mentioned above. After the wound cell is hot pressed into shape using this hot pressing device, the positive tab 108 and the negative tab 109 may be bent to the first side plane 103 to facilitate the flexible conductive sheet to connect the tabs of each wound cell 10, to form a battery structure.

As shown in FIG. 6, the hot pressing device may also include at least two guide bars 15. The second die 14 may also include a sliding mounting portion 141 provided at the top of the stamping head 140. This sliding mounting portion 141 may be slidingly connected to each guide bar 15 and move in a direction close to or away from the first die 13 along this guide bar 15. The movement trajectory of the second die 14 can be ensured by providing the guide bars 15, so as to ensure the quality of the hot press molding.

In addition, the hot pressing device may also include a drive structure (not shown in the figure) connected to the second die 14. The drive structure may drive the second die 14 to move in a direction close to or away from the first die 13.

Figure 7:
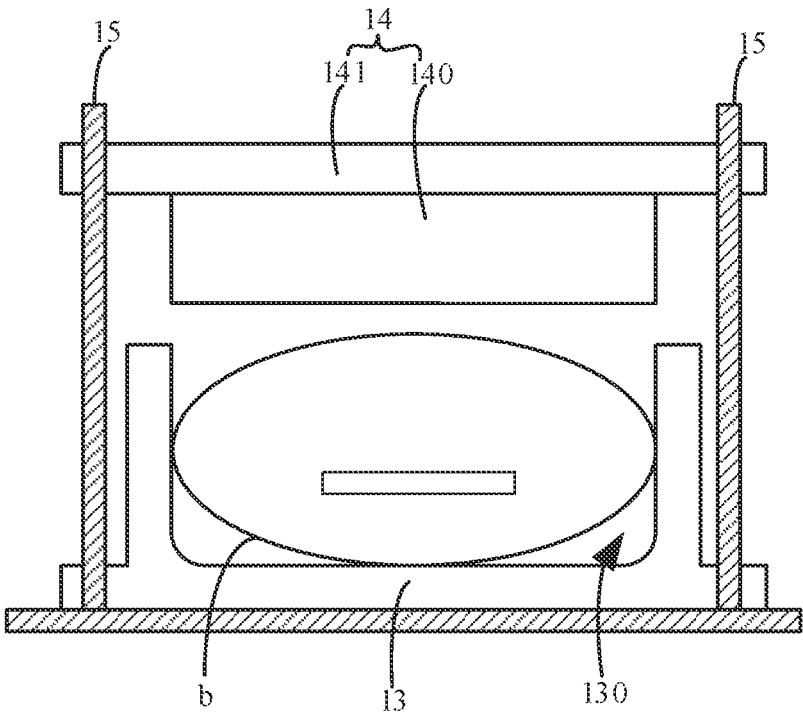
FIG. 7 illustrates a schematic diagram of the hot pressing device when the cell is not hot pressed as described in an embodiment of the present disclosure.
Figure 8:
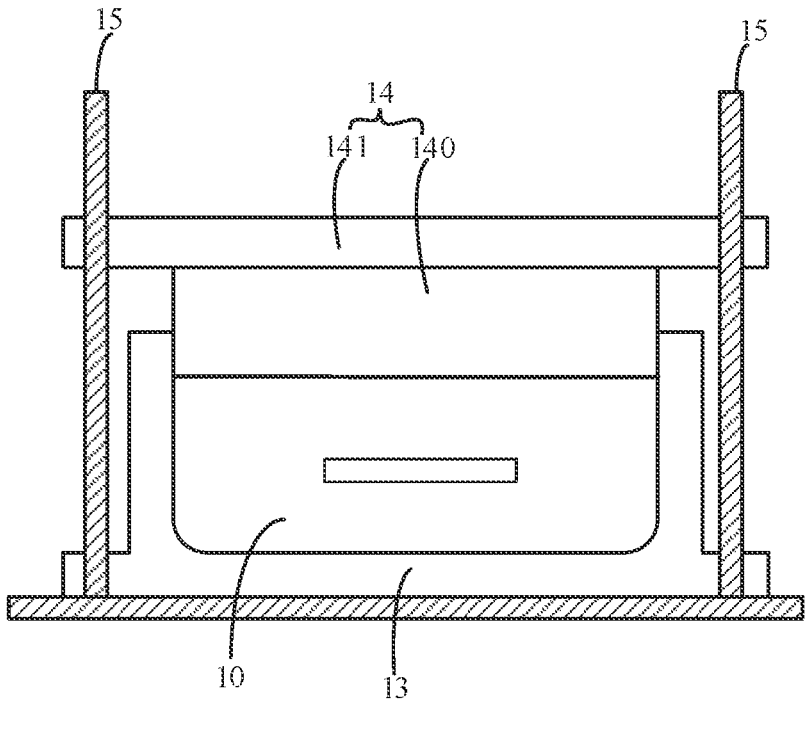
FIG. 8 illustrates a schematic diagram of the hot pressing device after the cell is hot pressed as described in an embodiment of the present disclosure.

For example, as shown in FIG. 7, during the hot pressing process, the wound cell b may be placed in the accommodating slot 130 of the first die 13 firstly. Then, the second die 14 is driven to move in a direction close to the first die 13. The stamping head 140 of this second die 14 matches with the accommodating slot 130, to hot press the cell b in the accommodating slot 130 into the wound cell 10 as shown in FIG. 8.

Based on the foregoing, compared with the square cell a shaped by conventional hot pressing in the related technology, the wound cell 10 manufactured by the hot pressing device of embodiments of the present disclosure can effectively improve the problems of relatively large width and thickness of the wound cell, uncontrollable size and uneven pores, which further improves the rate performance of the battery while ensuring the battery capacity.

Figure 9:
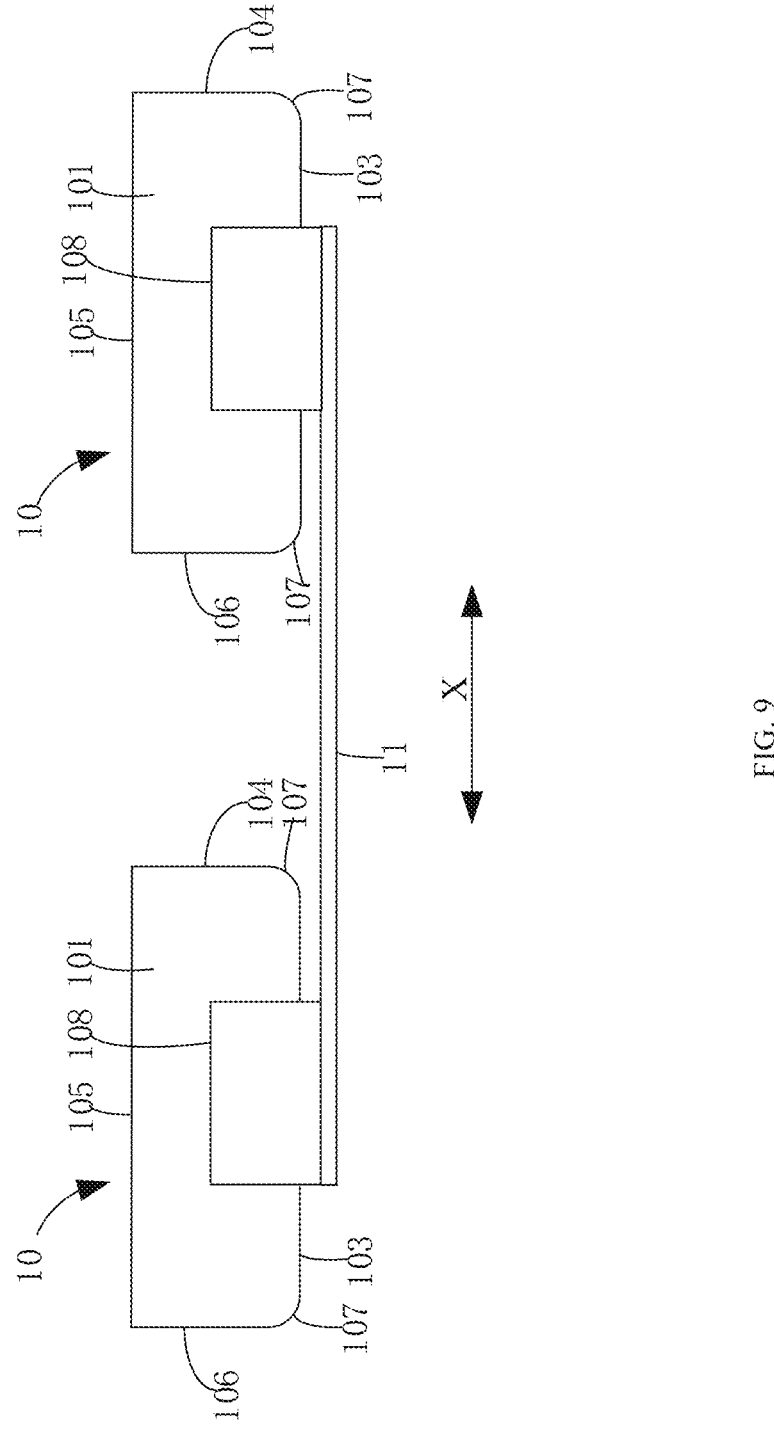
FIG. 9 illustrates a schematic plan view of the battery structure in a first view as described in an embodiment of the present disclosure.
Figure 10:
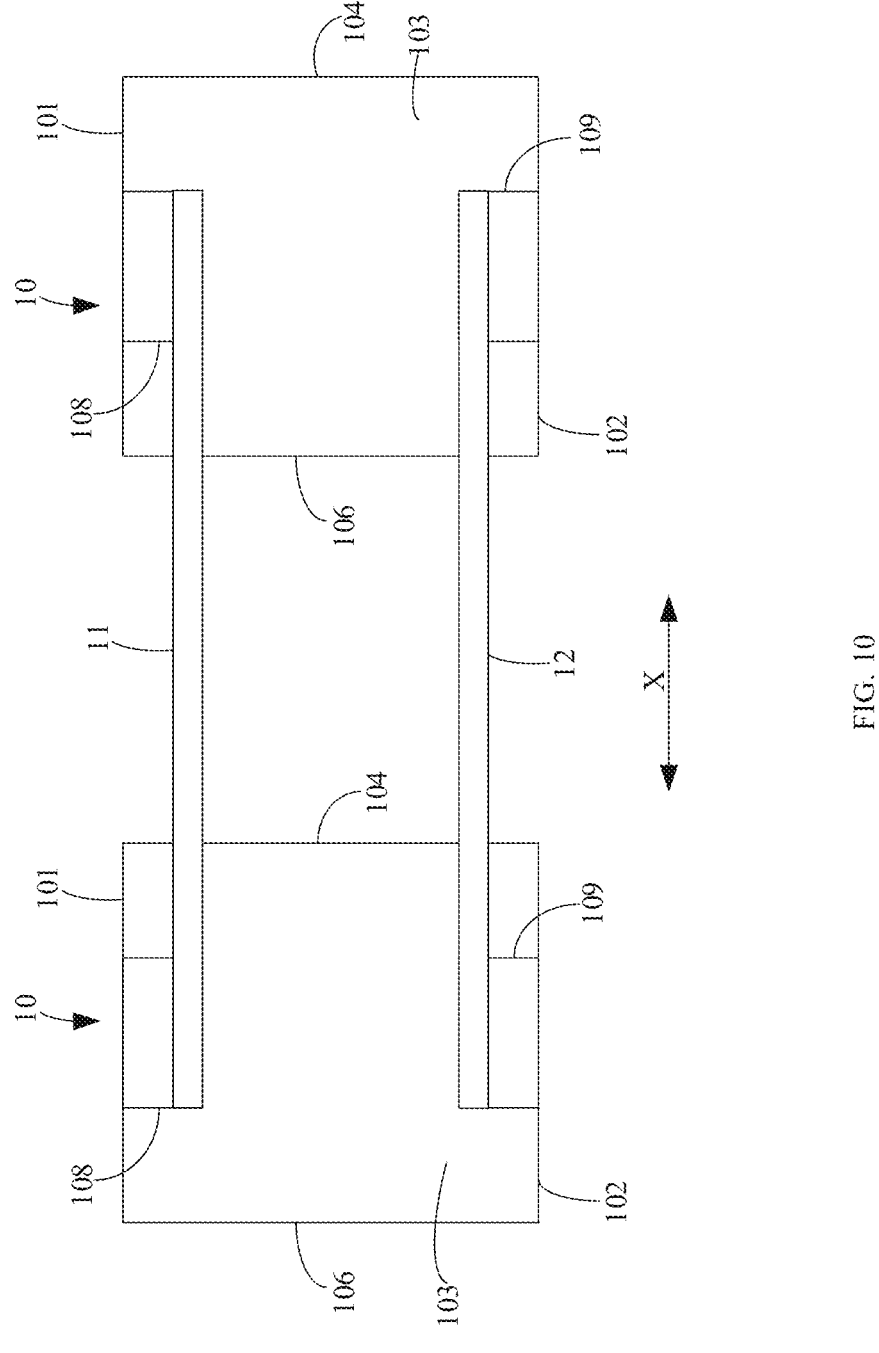
FIG. 10 illustrates a schematic plan view of the battery structure in a second view as described in an embodiment of the present disclosure.

Embodiments of the present disclosure also provide a battery structure including at least two wound cells 10 described in any of the above embodiments, as shown in FIGS. 9 and 10. The positive tab 108 and negative tab 109 of the wound cell 10 are bent to the target side plane. The at least two wound cells 10 are spaced apart in a horizontal direction X. This horizontal direction X is perpendicular to the winding axial direction Z.

In addition, as shown in FIGS. 9 and 10, the battery structure may also include at least one first flexible conductive sheet 11 and at least one second flexible conductive sheet 12. Two ends of the first flexible conductive sheet 11 are connected to the positive tabs 108 of two adjacent wound cells 10 respectively. For example, the two ends of the first flexible conductive sheet 11 may be connected to the positive tabs 108 of the two adjacent wound cells 10 by means of welding, etc. Since two adjacent wound cells 10 are spaced apart in a horizontal direction X, the middle portion of the first flexible conductive sheet 11 is overhung relative to the wound cell 10, and the middle portion of this first flexible conductive sheet 11 can be bent. Two ends of the second flexible conductive sheet 12 are connected to the negative tabs 109 of two adjacent wound cells 10 respectively. For example, the two ends of the second flexible conductive sheet 12 may be connected to the positive tabs 108 of the two adjacent wound cells 10 by means of welding, etc. Since two adjacent wound cells 10 are spaced apart in a horizontal direction X, the middle portion of the second flexible conductive sheet 12 is overhung relative to the wound cell 10, and the middle portion of this second flexible conductive sheet 12 can be bent.

In the embodiment of the present disclosure, the battery structure can be bent along the middle portions of the first flexible conductive sheet 11 and the second flexible conductive sheet 12, to realize the bending of the battery structure. That is, the battery structure of the embodiment of the present disclosure can be bent. This battery structure can be applied to electronic products such as flexible display devices.

Since joints of the target side plane and its adjacent two side planes of the wound cell 10 are set at chamfers 107, it can solve the problem of stress concentration at corners of the wound cell 10 and the flexible conductive sheet during the bending, thus improving the bending reliability and flatness of the product.

In an embodiment, the positive tab 108 and negative tab 109 of the wound cell 10 are bent to the first side plane 103 of the wound cell 10. The first side plane 103 of each wound cell 10 is located in the same plane, which is designed to facilitate the connection of the flexible conductive sheet with the adjacent wound cell 10, as well as to ensure the stability of the connection between the flexible conductive sheet and the wound cell 10 when it is not bent. In addition, it can also ensure the flatness of the entire battery structure and facilitate the assembly of the battery structure with the whole machine.

Embodiments of the present disclosure also provide a flexible display device, which includes the battery structure described in any of the above embodiments. It should be understood that the flexible display device may also include a flexible display panel. The bendable area of this flexible display panel may correspond to the middle portion of the flexible conductive sheet in the battery structure, so as to realize the overall bending of the flexible display device.

It should be noted that the in addition to the aforementioned flexible display panel and battery structure, the flexible display device may also include other parts and compositions, such as circuit boards, housings, etc., which can be added accordingly according to the specific use requirements of the flexible display device by those skilled in the art, and will not be repeated herein.

In the embodiments of the present disclosure, the specific type of the flexible display device is not particularly limited, and any type of flexible display device commonly used in the art can be used, such as a television, a cell phone, a computer, a medical device, etc. Those skilled in the art can make corresponding selection according to the specific usage of the flexible display device, which will not be repeated herein.

The technical solutions provided by the present disclosure may achieve the following beneficial effects.

In the wound cell, battery structure, flexible display device and hot pressing device of the present disclosure, by chamfering the joint of at least two adjacent side planes of the wound cell, it may improve the interfacial contact between the separator and electrode sheets, so as to reduce the internal resistance of the battery, improve the ionic conductivity, and thus enhance the capacity utilization. In addition, by chamfering the joint of at least two adjacent side planes of the wound cell, it can also solve the problem of stress concentration at the corners of the wound cell during the bending process of the battery structure, and improve the bending reliability and flatness of the product.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as exemplary only, with the true scope and spirit of the disclosure being indicated by the appended claims.

What is claimed is:

1. A wound cell, wherein the wound cell has a first end surface and a second end surface opposite to each other in a winding axis direction and an outer peripheral surface disposed between the first end surface and the second end surface, the outer peripheral surface comprises four side planes sequentially connected end to end, and a joint of at least two adjacent side planes is provided at a chamfer, and a tab protrudes from at least one of the first end surface and the second end surface, and the tab is capable of being bent to the side planes, wherein the four side planes comprise a first side plane and a third side plane parallel to a first reference plane, and a second side plane and a fourth side plane parallel to a second reference plane, wherein the first side plane, the second side plane, the third side plane and the fourth side plane are sequentially connected end to end, the first reference plane and the second reference plane are perpendicular to each other and both the first reference plane and the second reference plane are parallel to the winding axis direction, wherein the chamfer is the planar chamfer, a width of an orthographic projection of the planar chamfer on the first reference plane is a first width, a width of a orthographic projection of the planar chamfer on the second reference plane is a second width, and the first width is equal to the second width.

2. The wound cell according to claim 1, wherein the first width and the second width are from 0.4 mm to 5 mm.

3. The wound cell according to claim 1, wherein
the tab is provided with at least two, the at least two tabs comprise a positive tab and a negative tab, the positive tab protrudes from the first end surface and the negative tab protrudes from the second end surface;

the positive tab and the negative tab are capable of being bent to an identical side plane or being bent to different side planes respectively;

wherein the side plane opposite to the bent positive tab and negative tab is a target side plane, joints of the target side plane and two adjacent side planes are provided at chamfers.

4. The wound cell according to claim 3, wherein the positive tab and the negative tab are capable of being bent to the first side plane, and a joint of the first side plane and the second side plane and a joint of the first side plane and the fourth side plane are provided at chamfers.

5. The wound cell according to claim 4, wherein a joint of the third side plane and the second side plane and a joint of the third side plane and the fourth side plane are provided at chamfers.

6. A battery structure, applied to a flexible display device and comprising:

at least two wound cells spaced in a horizontal direction, wherein the wound cell is the wound cell according to claim 3, and the positive tabs and the negative tabs of the wound cells are bent to the target side plane, the horizontal direction is perpendicular to the winding axis direction;

at least one first flexible conductive sheet, wherein two ends of the first flexible conductive sheet are connected to the positive tabs of two adjacent wound cells respectively, and a middle portion of the first flexible conductive sheet is capable of being bent;

at least one second flexible conductive sheet, wherein two ends of the second flexible conductive sheet are connected to the negative tabs of two adjacent wound cells respectively, and a middle portion of the second flexible conductive sheet is capable of being bent.

7. The battery structure according to claim 6, wherein the positive tabs and the negative tabs are bent to the first side plane, the first side plane of each of the wound cells is located in an identical plane.

8. A flexible display device, comprising the battery structure according to claim 6.

9. A hot pressing device for wound cells, comprising a first die and a second die, wherein the first die and the second die are capable of moving relative to each other to enclose a hot pressing cavity for hot pressing wound cells, an inner peripheral surface of the hot pressing cavity matches with the outer peripheral surface of a wound cell, wherein the wound cell has a first end surface and a second end surface opposite to each other in a winding axis direction and an outer peripheral surface disposed between the first end surface and the second end surface, the outer peripheral surface comprises four side planes sequentially connected end to end, and a joint of at least two adjacent side planes is provided at a chamfer, and a tab protrudes from at least one of the first end surface and the second end surface, and the tab is capable of being bent to the side planes, wherein the four side planes comprise a first side plane and a third side plane parallel to a first reference plane, and a second side plane and a fourth side plane parallel to a second reference plane, wherein the first side plane, the second side plane, the third side plane and the fourth side plane are sequentially connected end to end, the first reference plane and the second reference plane are perpendicular to each other and both the first reference plane and the second reference plane are parallel to the winding axis direction, wherein the chamfer is the planar chamfer, a width of an orthographic projection of the planar chamfer on the first reference plane is a first width, a width of a orthographic projection of the planar chamfer on the second reference plane is a second width, and the first width is equal to the second width.

10. A flexible display device, comprising the battery structure according to claim 7.

* * * * *